United States Patent [19]

Melliger

[11] 4,037,794
[45] July 26, 1977

[54] GRANULATION APPARATUS

[75] Inventor: Guido W. Melliger, Dover, N.J.

[73] Assignee: Dierks & Sohne, Osnabrueck, Germany

[21] Appl. No.: 508,422

[22] Filed: Sept. 23, 1974

[51] Int. Cl.² .............................................. B02C 23/12
[52] U.S. Cl. .................................. 241/46.17; 241/52; 241/57; 241/79.2
[58] Field of Search ............... 241/46.11, 46.17, 52, 241/57, 79.2

[56] References Cited

U.S. PATENT DOCUMENTS

| | | | |
|---|---|---|---|
| 2,756,646 | 7/1956 | Jones | 241/46.17 |
| 3,605,836 | 9/1971 | Schnell | 241/65 |
| 3,713,594 | 1/1973 | Blakely et al. | 241/46.17 |
| 3,722,831 | 3/1973 | Bialas | 259/6 |
| 3,743,539 | 7/1973 | Kroyer et al. | 241/46.17 |
| 3,877,649 | 4/1975 | Herfeld | 241/65 |

Primary Examiner—Granville Y. Custer, Jr.

[57] ABSTRACT

This invention provides an apparatus for the preparation of dry-medicament granulation. The apparatus comprises an enclosed-circular mixing chamber containing mixing means with a separate air inlet means and air outlet means, both of which are in flow communication with the chamber. The air outlet means is provided with a collecting bag for collecting the dry-fine particles of the medicament granulation and is equipped with a vibrator for returning them to the mixing chamber. The apparatus provides a means for a one step preparation in a batch process of medicament granulations, whereby the granulations may be directly compressed into solid-dosage forms without further processing.

11 Claims, 3 Drawing Figures

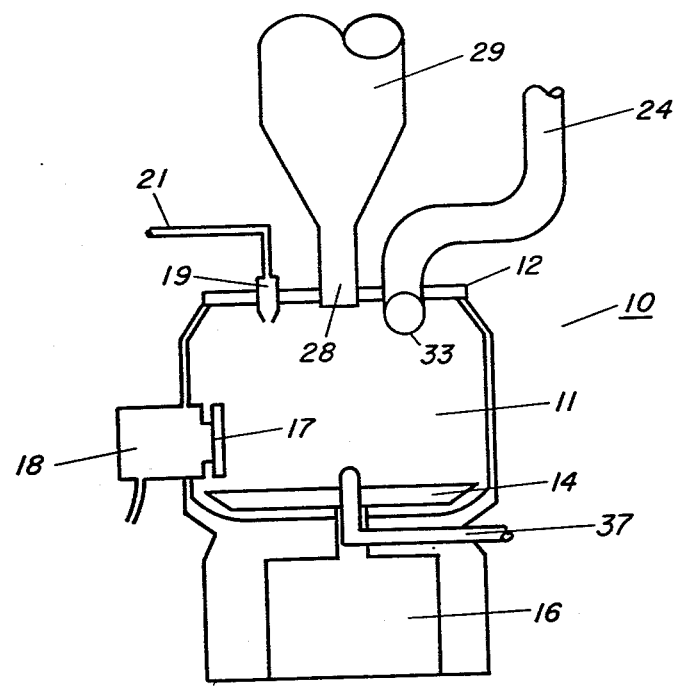
FIG. 2
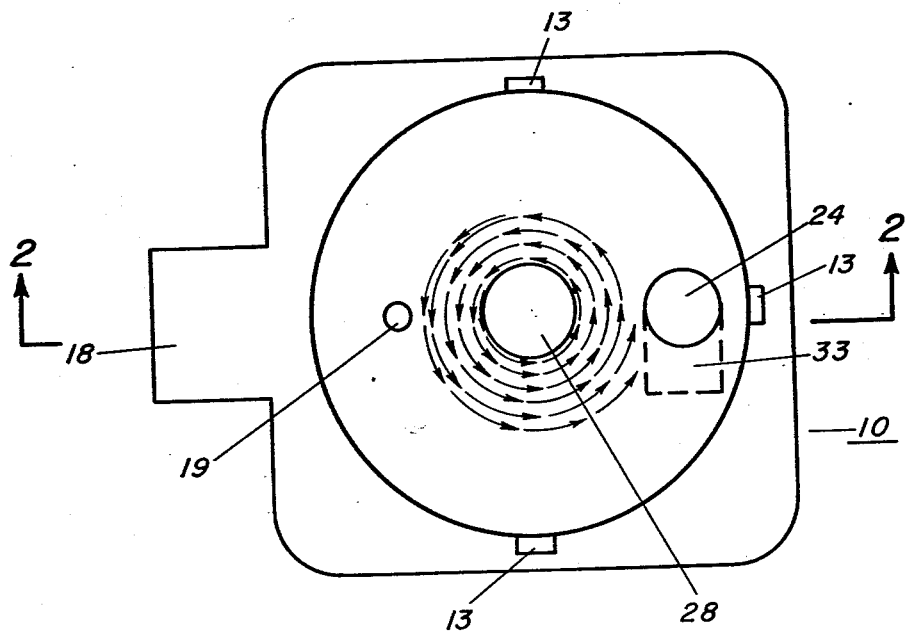

GRANULATION APPARATUS

This invention provides an apparatus and process for the preparation of dry medicament granulations. More particularly, it provides an apparatus and process for preparing dry medicament granulations in a one step batch process, whereby the granulation, without further processing, may be formed into solid-dosage pharmaceutical preparations.

Prior art preparation of medicament granulations is a complicated process requiring numerous steps to obtain a final product. Generally, the steps involved are:(1) sifting the raw materials to delump agglomerations; (2) the mixing of the ingredients and compacting the mixed material into granules after the addition of granualating liquids; (3) drying the mixture to remove the solvents; and (4) sizing of the dry product by breaking any agglomerations and by eliminating over-and undersized particles.

Recent advances in the apparatus in the art of granulation have included in introduction of the fluidized bed granulator. Basically, this granulator is a fluidizied bed dryer adapted to handle the mixing and compacting steps of the granulating process. However, even this advance in the art has certain inherent limitations. The most detremental of which is the fact that fluidizied beds are poor mixers which may require the manually breaking up of agglomerates.

It is an object of this invention to prepare dry medicament granulations in a one step batch process without the necessity for additional handling involved in the drying step.

It is also an object of this invention to provide an apparatus which achieves dry medicament granulations in a one step batch process in one vessel.

These and other objects of the invention will be understood from the following detailed description and drawings, wherein;

FIG. 2 is a sectional view of the granulation apparatus of FIG. 1;

FIG. 3 is a top view of the apparatus of FIG. 1 along the lines 3 —3.

Figure 1:
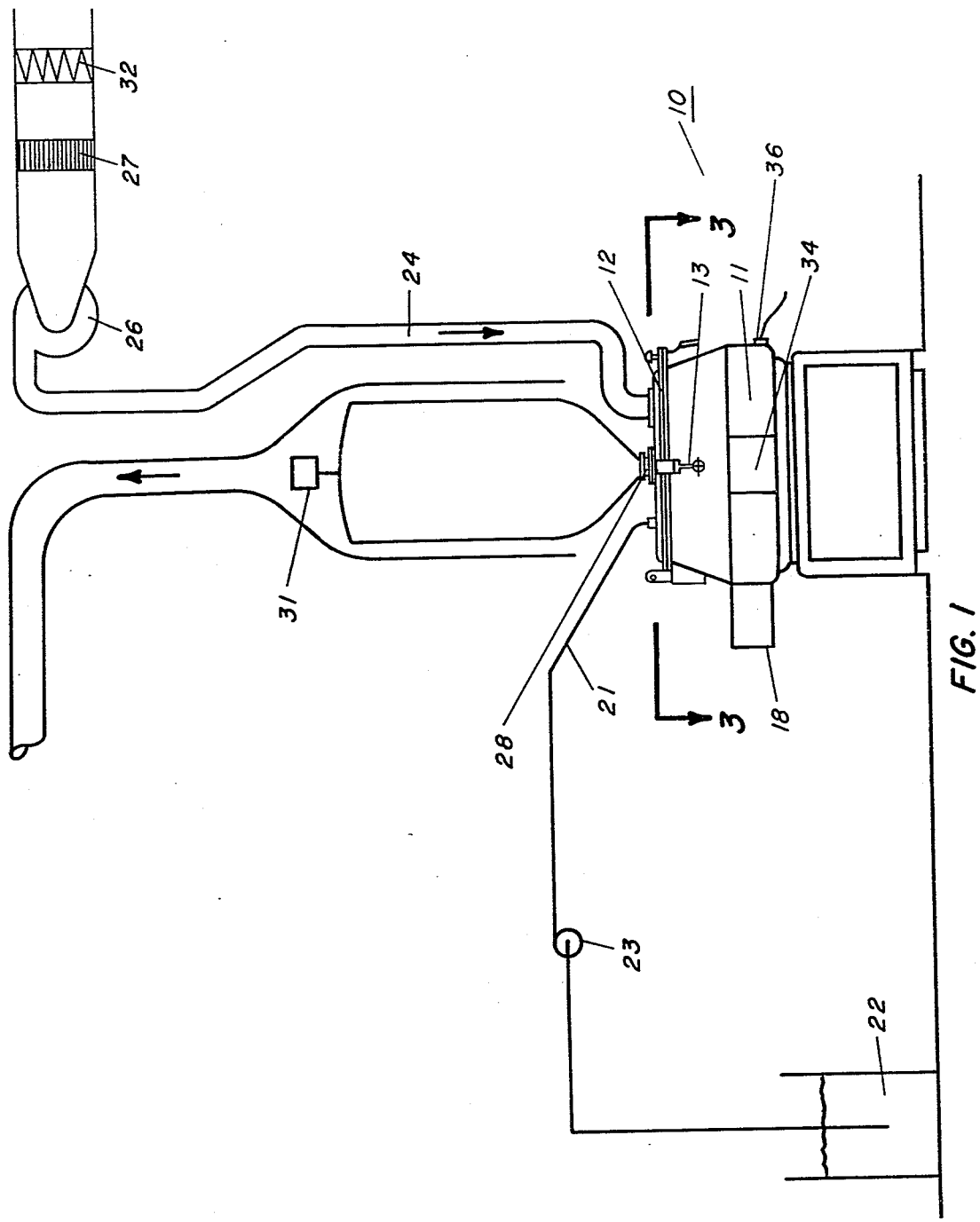
FIG. 1 is a frontal view of the granulation apparatus of this invention.

Broadly, this invention provides an apparatus for the preparation of dry medicament granulations, which comprise in combination, an enclosed circulatory mixing chamber having a sealable loading port and a mixing means, a separate air inlet means and an air outlet means both of which are in flow communication with the chamber. The air outlet means is provided with a means for collecting dry-fine particles of the medicament granulation, and the collecting means are further provided with means for returning the dry particles to the mixing chamber. Also provided, are means for introducing granulating liquids into the mixing chamber.

The mixing means preferably comprises a plurality of separately rotating mixing blades and chopper blades, each of which have a varible speed control. The mixing blades are mounted at the base of the mixing chamber and rotate horizontally with respect to the vertical axis of the chamber, while the chopper blades are mounted on the circular walls of the chamber and rotate vertically with respect to the horizontal axis of the chamber. The air outlet means consists of a conduit communicatively connected between the mixing chamber and the collecting means, which may be, for example, a filter bag, which is porous to the exiting air, but is impervious to the fine granular particles which may exit from the mixing chamber. The filter is in communication with a vibrator apparatus, which upon vibration of the filter losens the particles collected therein and returns them to the mixing chamber.

In the operation, of the apparatus of this invention, the dry medicament materials are added to the mixing chamber, via the loading port or cover. The port or cover is then sealed and the mixing blades set in rotatable motion. With the rotation of the mixing blades, granulating liquids are introduced into the mixing chamber, via a conduit from a liquid storage tank and are blended with the dry medicament material. As the dry material and the liquid are blended, air is introduced into the chamber, via a conduit from an air supply source, which source may contain a filter and a heater for raising the temperature of the drying air. As the blend of medicament and granulating liquids are maintained in an agitated state due to the motion of the mixing blades and the chopper blades, air is circulated through the blend. The air is preferentially introduced tangentially into the mixing chamber and together with the rotation of the mixing blades generates a vortex within the mixing chamber resulting in a cyclone effect, which acts as a centrifugal separator. Because of this cyclone effect, only the fine-dry particles of the granulation are swept up in the drying air stream and removed from the mixing chamber and trapped in the filter. The fine particles collect on the inner surface of the filter and when the build up of particles is such as to interfere with the air flow through the filter, a vibrator, which is in communication with the filter is actuated and the particles are vibrated loose from the inner surface of the filter bag and returned to the mixing chamber for reblending with the dry granulation.

In the granulation process, air flow is dependent upon the volume of the mixing chamber, e.g., at 600 liter chamber requires an air flow of from about 100 to 800 CFM preferably, 150 to 400 CFM. The air entering the chamber is initially at ambient temperature, because the mixing of the granulation causes a rise in the internal temperature of the granulation. As the granulation becomes drier, its temperature drops and the rotation of the mixing blades is reduced, while the incoming air temperature is raised to maintain an optimum granulation temperature. Optimal granulation temperature is from 30° to 60° C, and is maintained by raising the air temperature incrementally to about 40° to 70° C.

The apparatus of this invention will best be understood by the following detailed description:

Referring now to FIG. 1, there is shown, generally, at 10 the granulating apparatus of this invention. The dry medicament formulation is introduced into the mixing chamber 11 (e.g., 600 liter volume) of the apparatus, via the port or cover 12. In the drawings, this port is shown as a hinged cover mounted the top of the mixing apparatus, however, it is understood that this port may be a portion of the top as its size is not critical to the operation of the apparatus. When the dry medicament formulation has been loaded into the mixing chamber, the port 12 is sealed, via latches 13. The mixing blades 14 (see FIG. 2) are actuated by the motor 16 and are initially rotated at their minimum rotatable speed. The chopper blades 17 are also set in motion at the same time by the actuation of the motor 18, while the liquid granulating material, e.g., solvents binders are introduced into the mixing chamber 11 through inlet conduit 19, via conduit 21 from the liquid storage tank 22 by means of a pump 23. After the dry materials and the liquid granulating materials have been mixed for a period of time, e.g., about 1 to 5 minutes, air is introduced to the mixing chamber 11, via conduit 24 from an air supply blower 26. The air is filtered by a filter 27 prior to its introduction into a conduit 24. The air at this time is at ambient temperature and the rotational speed of the mixing blades and the chopper may now be reduced to a slow speed. The internal temperature of the mixing chamber is desirably maintained at from 40° to 60° C., preferably, 45° to 50° C. during the entire drying process. The air temperature is gradually raised by means of heater 32 over a period of about 5 minutes to a temperature between 40° and 70° C., preferably 50° to 60° C., and the entire operation maintained at this rotational speed and temperature for about 1 hour. At the first indication of fine-dry particles, the chopper speed is reduced to slower speed, to lessen the chance of fines.

The rotational movement of the blades and the tangential introduction (see FIGS. 2 and 3, reference numeral 33) of the air into the mixing chamber creates, as noted above, a vortex with the mixing chamber causing the fine-dry particles to be separated from the mixing mass and carried on the exiting air, via conduit 28 into the filter chamber 29. The filter chamber may be a filter bag, which as describes above, is porous to the exiting air but is impervious to the granulated particles. When a sufficient amount of the fine granulated particles have collected on the inside of the filter, the vibrator 31 is actuated, via means not shown to vibrate the filter bag 29 and cause the particles to settle back into the mixing chamber 11, desirably at the end of the granulation process.

After the granulation has been dried, the apparatus is stopped, an exit port 34 opened and the granulation batch removed for porcessing into solid dosage forms.

As noted above, it is desirable to maintain the granulation temperature at from 40 to 60° C. Granulation temperature may be monitored by conventional means, for example, by a temperature sensor 36 afixed to the outside surface of the mixing chamber 11. Since the granulation as it is blended in the chamber is in contact with the walls of the chamber, the outside sensor 36 is a reliable indicator of the granulation temperature.

In an embodiment of this invention, air may be brought into the mixing chamber through means other than through conduit 24 at the top of the mixing chamber 11. For example, air may be introduced into the mixing chamber, via conduit 37 through the mixing blades 14 at the base of the mixing chamber 11, (see FIG. 2). Air may also be introduced into the mixing chamber, simultaneously, through both top conduit 24 and bottom conduit 37.

As can be appreciated by those skilled in the art, the apparatus and the process of this invention provides a rapid and economical means for a one step batch processing of medicament formulations into granulations that are suitable for immediate conversion into pharmaceutical-solid dosage forms.

What is claimed is:

1. In an apparatus for the preparation of dry medicament granulations, an enclosed circular mixing chamber which is axially symmetrical about a vertical axis, sealable first means in communication with the chamber for introducing ungranulated medicament directly into the chamber, second means in communication with the chamber and disposed in spaced relation to the first sealable means for introducing granulating liquids into the chamber, rotatable mixing means supported within the chamber, third means in communication with the chamber for introducing drying air into the chamber, and forth means in communication with the chamber for withdrawing air from the chamber.

2. Apparatus as defined in claim 1, in which the air withdrawing means comprises means for collecting fine granular particles of medicament.

3. Apparatus as defined in claim 1, in which the mixing means comprises, in combination, a plurality of mixing blades rotatable about the vertical axis, and a plurality of chopper blades disposed in spaced relation to the mixing blades and rotatable about a horizontal axis.

4. Apparatus as defined in claim 2, in which the collecting means comprises filter means impervious to the fine granular particles of medicament.

5. Apparatus as defined in claim 4, in which the collecting means further comprises vibrating means copperable with the filter means and operable to agitate the filter means.

6. Apparatus as defined in claim 1, in which the drying air introducing means are disposed on the top of the mixing chamber.

7. Apparatus as defined in claim 3, further comprising first variable-velocity means for driving the mixing blades.

8. Apparatus as defined in claim 3, further comprising second variable-velocity means for driving the chopper blades.

9. Apparatus as defined in claim 1, further comprising heating means associated with the drying air introducing means for raising the temperature of the introduced drying air to a selectable value.

10. In a apparatus for the preparation of dry medicament granulations, an enclosed circular mixing chamber axially symmetrical about a vertical axis, first sealable means in communication with the chamber for introducing ungranulated medicament directly into the chamber, second means in communication with the chamber and disposed in spaced relation to the first sealable means for introducing granulating liquid into the chamber, rotatable mixing means supported within the chamber, third means communicating with the chamber for introducing drying air into the chamber tangentially to the chamber walls, the mixing means effecting a vortex-like flow of the medicament and the granulating liquid in the chamber, and fourth means in commumication with the chamber for withdrawing air from the chamber.

11. The improvement in an apparatus for the preparation of dry medicament granulations as set forth in claim 10, wherein said air-introducing means cooperates with said mixing means to effect said vortex-like flow of medicament.

* * * * *